US011829894B2

(12) United States Patent
Medalion et al.

(10) Patent No.: US 11,829,894 B2
(45) Date of Patent: Nov. 28, 2023

(54) CLASSIFYING ORGANIZATIONS BASED ON TRANSACTIONAL DATA ASSOCIATED WITH THE ORGANIZATIONS

(71) Applicant: Intuit Inc., Mountain View, CA (US)

(72) Inventors: Shlomi Medalion, Lod (IL); Yehezkel Shraga Resheff, Hod Hasharon (IL); Sigalit Bechler, Hod Hasharon (IL); Elik Sror, Hod Hasharon (IL)

(73) Assignee: Intuit Inc., Mountain View, CA (US)

( * ) Notice: Subject to any disclaimer, the term of this patent is extended or adjusted under 35 U.S.C. 154(b) by 473 days.

(21) Appl. No.: 16/917,656

(22) Filed: Jun. 30, 2020

(65) Prior Publication Data
US 2021/0406725 A1 Dec. 30, 2021

(51) Int. Cl.
*G06F 7/00* (2006.01)
*G06N 5/04* (2023.01)
*G06N 20/00* (2019.01)
*G06F 16/23* (2019.01)

(52) U.S. Cl.
CPC ........... *G06N 5/04* (2013.01); *G06F 16/2379* (2019.01); *G06N 20/00* (2019.01)

(58) Field of Classification Search
CPC ............. G06F 16/2379; G06F 16/2477; G06F 16/2282; G06F 16/2237; G06F 16/24542; G06F 16/951; G06F 40/30; G06F 40/284; G06F 40/216; G06N 20/00; G06N 5/04; G06Q 30/0201
See application file for complete search history.

(56) References Cited

U.S. PATENT DOCUMENTS

| | | | |
|---|---|---|---|
| 10,977,250 B1 * | 4/2021 | Lesner | G06F 16/2237 |
| 2010/0299294 A1 * | 11/2010 | Mott | G06F 16/285 707/E17.046 |
| 2016/0260166 A1 * | 9/2016 | Camillo | G06Q 50/01 |
| 2020/0380021 A1 * | 12/2020 | Barbour | G06F 16/164 |
| 2021/0064697 A1 * | 3/2021 | Fox | G06F 40/205 |

* cited by examiner

*Primary Examiner* — Mohammad A Sana
(74) *Attorney, Agent, or Firm* — FERGUSON BRASWELL FRASER KUBASTA PC

(57) ABSTRACT

A method for classifying organizations involves obtaining, for an unknown organization, transactional data representing a multitude of transactions. The transactional data comprises a descriptive text for each of the multitude of transactions. The method further involves processing the descriptive text for each of the multitude of transactions to obtain one vector representing the unknown organization, categorizing the unknown organization using a classifier applied to the vector, and identifying a software service for the unknown organization, according to the categorization.

20 Claims, 8 Drawing Sheets

| | 200 Line Items |
|---|---|
| 0 | Shipping |
| 1 | Square Transaction |
| 2 | Sandwich - Bag - Red Bird |
| 3 | Lunchskins Sealable Paper Sandwich & Snack Bags, Shark, 50 Count Box |
| 4 | Lunchskins Sub - Sub - USA - Red Spoon |
| 5 | Quart Bag Red Bird |
| 6 | Square Tips Money |
| 7 | Square Sale (Square Transaction ID # 14Rbpec0arSRDYh0LFVcLQB) |
| 8 | SoonHari Yogurt Soju, 6btl/pack(0 37182 99036 2) |
| 9 | Recyclable + Sealable Paper Sandwich & Snack Bags Apple Box of 50UPC 854735005911 |
| 10 | Square Transaction |
| 11 | Quart Bag Red Bird |
| 12 | LIGHT OFF-WHITELUNCHSKINS |
| 13 | Creamy Pecan Butter-SAMPLE |
| 14 | Cass, 355 ML CAN 2x12 |
| 15 | Cass Fresh 640ML 12 BTL |
| 16 | Tower of Treats |
| 17 | SoonHari Peach 375ML 20 BTL(6 43485 99448 0) |
| 18 | Lunchskins - Sandwich - Bag - USA - Orange Bike |
| 19 | Square Transaction |
| 20 | Square Transaction |
| 21 | Square Transaction |
| 22 | Lunchskins 2 Pack Zip Bag Set (1 Navy Stripe Sandwich   1 Navy Dot Snack) |
| 23 | Kloud Original Gravity 355ML CAN 4/6 |
| 24 | Recyclable + Sealable Paper Sandwich & Snack Bags Shark Box of 50UPC 854735005904 |
| 25 | Sandwich Case Pack - Aqua Dragonfly |
| 26 | 2 lunchskins of each of the three PBS styles (robot, dog, butterfly) |
| 27 | Snack - Bag - Red Stripe |
| 28 | Lunchskins - Sandwich - Bag - USA - Aqua Crab |
| 29 | Snack Case Pack - Berry Dot |
| 30 | Cass Fresh 355ML CAN 4/6 |
| 31 | Square Transaction |
| 32 | LIGHT OFF-WHITELUNCHSKINS |
| 33 | Square Transaction |
| 34 | [2049] Blueberry 10pc x 10px |
| 35 | Lunchskins Mainline - Snack - Bag - USA - Navy Car |
| 36 | Sandwich - Bag - Berry Flower |
| 37 | Chum-Churum (Original) 375ML 20 BTL - 6 49241 86103 4 |
| 38 | Single - 1 Multi-pack Set (Sandwich/Snack) - Whale Blue |
| 39 | Square Transaction |
| 40 | 2-Pack Bag Set Green Stripe Sandwich Bag and Dot Snack |
| 41 | 0069-7425751-0589 |
| 42 | Sandwich Bag - Charcoal Bicycle |
| 43 | Sandwich Bag - Green Tree |
| 44 | Square Transaction |
| 45 | Sandwich - Bag - Red Bird |
| 46 | Square Transaction |
| 47 | ZIP SANDWICH BAG CHARCOAL CIRCLESUPC 860000894371 |
| 48 | Square Sale (Square Transaction ID # Hplp6FxhlFY4VOj56wq7JQB) |
| 49 | Square Transaction |

*FIG. 2*

CLASSIFYING ORGANIZATIONS BASED ON TRANSACTIONAL DATA ASSOCIATED WITH THE ORGANIZATIONS

BACKGROUND

Organizations that use software services may be categorized by type. For example, commercial activity of a business may be mainly product-oriented, service-oriented, and/or project-oriented. Knowing the category of an organization may be beneficial or even critically important for various reasons. Specifically, when providing software services to organizations, a one-size-fits-all approach may be suboptimal, because requirements of organizations frequently deviate significantly, depending on the type of the organization. For these and other reasons, discussed below, identifying the type of an organization may be desirable.

SUMMARY

In general, in one aspect, one or more embodiments relate to a method for classifying organizations, comprising: obtaining, for an unknown organization, transactional data representing a plurality of transactions, wherein the transactional data comprises a descriptive text for each of the plurality of transactions; processing the descriptive text for each of the plurality of transactions to obtain one vector representing the unknown organization; categorizing the unknown organization using a classifier applied to the vector; and identifying a software service for the unknown organization, according to the categorization.

In general, in one aspect, one or more embodiments relate to a method for classifying organizations, the method comprising: obtaining a plurality of labels for a plurality of known organizations, wherein each of the plurality of labels identifies a category to which the known organization associated with the label belongs; obtaining, for each of the plurality of known organizations, transactional data associated with a plurality of transactions, wherein the transactional data comprises a plurality of descriptive texts for the plurality of transactions; processing the plurality of descriptive texts to obtain a plurality of vectors for the plurality of known organizations, by: identifying, separately for each of the plurality of known organizations, frequently occurring words in the plurality of descriptive texts associated with the known organization; obtaining word embeddings for the frequently occurring words; and calculating a weighted average of the word embeddings to obtain the vector representing the known organization, wherein each of the plurality of vectors represents one of the plurality of known organizations; and training a classifier, using, for each of the plurality of known organizations, the vector representing the known organization and the label associated with the known organization.

In general, in one aspect, one or more embodiments relate to a system for classifying organizations, the system comprising: a computer processor; and a classification engine executing on the computer processor configured to: obtain, for an unknown organization, transactional data representing a plurality of transactions, wherein the transactional data comprises a descriptive text for each of the plurality of transactions; process the descriptive text for each of the plurality of transactions to obtain one vector representing the unknown organization; categorize the unknown organization using a classifier applied to the vector; and identify a software service for the unknown organization, according to the categorization.

Other aspects of the invention will be apparent from the following description and the appended claims.

BRIEF DESCRIPTION OF DRAWINGS

FIG. 2 shows an example of line items, in accordance with one or more embodiments of the disclosure.

DETAILED DESCRIPTION

Figure 1:
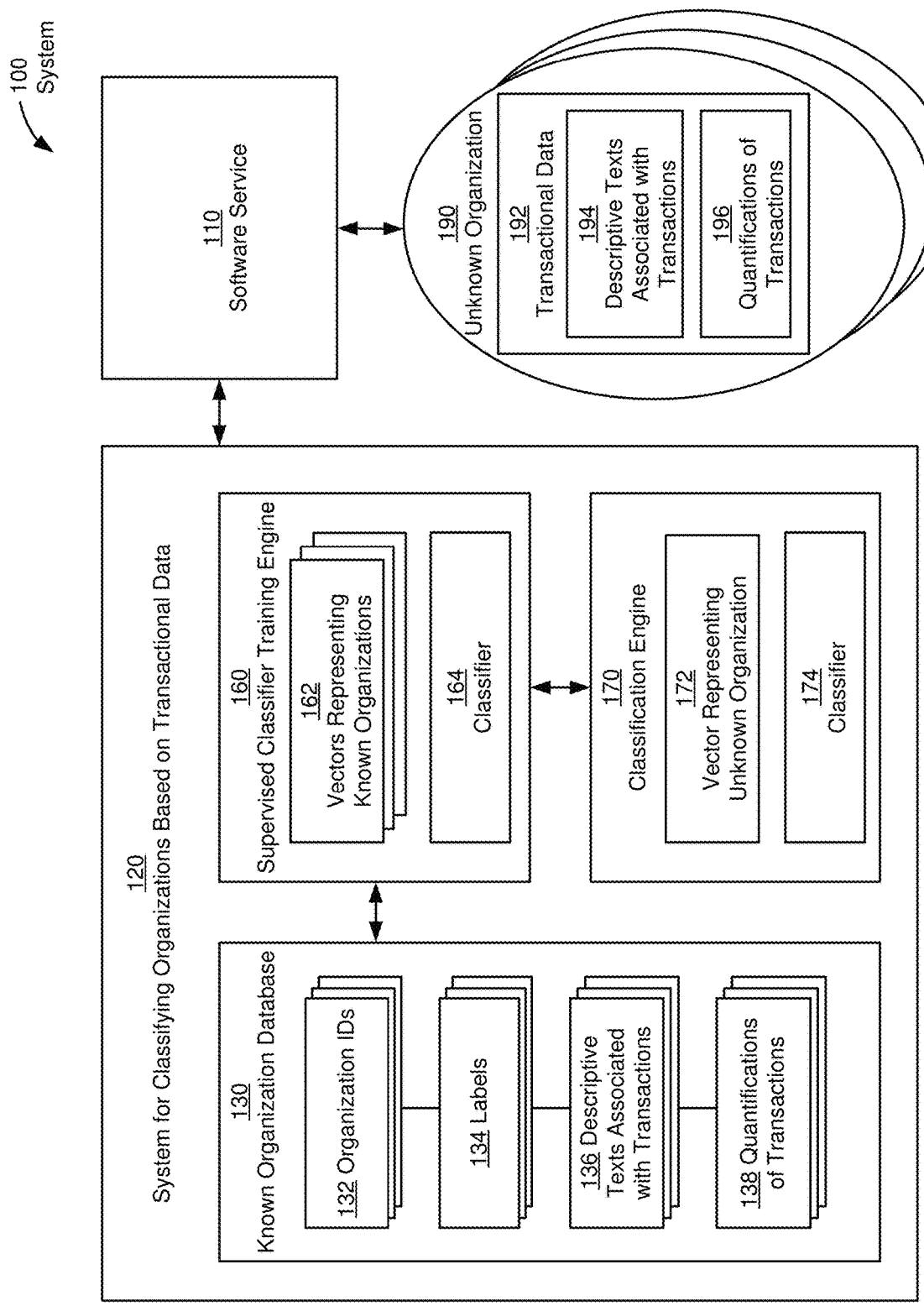
FIG. 1 shows a system for classifying organizations based on transactional data, interacting with a software service accessed by an unknown organization, in accordance with one or more embodiments of the disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

Embodiments of the disclosure allow classification of organizations based on transactional data associated with the organizations. In one specific application, an organization may be classified as being product-oriented, service-oriented, and/or project-oriented. Product-oriented organizations primarily sell products. For example, a hardware store may sell various types of hardware such as paint, tools, and plants. Service-oriented organizations primarily provide services. For example, a hair salon may offer various types of services such as haircuts, hair dyeing, and other beauty services. Project-oriented organizations primarily deliver projects. For example, an architect may offer projects such as a residential or commercial construction, remodeling, etc.

While these different types of organizations may all use software services that provide certain functionalities such as administrative assistance, e.g., for invoicing, bookkeeping, etc., the needs for other functionalities may differ, between the different types of organizations. For example, while a functionality for managing inventory may be essential for managing an inventory of a product-oriented organization, a service-oriented organization, while still having an inventory, may require a very different approach to managing its inventory, whereas the functionality for managing inventory may have little to no value for a project-oriented organization.

Accordingly, to deliver or market an appropriate set of functionalities of the software services to organizations, it may be beneficial to identify the types of the organizations. Further, it may also be beneficial for the provider of the software services to obtain a better understanding of its user base (i.e., the organizations using the software services) to enable a more targeted software development, support, marketing, etc.

Conventionally, an organization may be classified based on data provided by the organization. For example, a feedback form may ask an organization to specify the type of the organization. Additionally or alternatively, sales channels used by an organization may indicate the type of organization. For example, an organization that uses eBay for its sales is likely to be product-oriented but less likely to be service or project-oriented. Further, other indicators such as a merchant category code (MCC) may be used to determine the type of an organization. For example, the MCC code "0742" in a billing statement may represent a veterinary service, whereas the MCC code "1711" may represent heating, plumbing, A/C business. Rules may thus be applied to billing statements or other transactional documents that include MCC codes, to determine the type of the organization.

However, various shortcomings limit the value of these conventional approaches. Specifically, an organization may fail to provide information on its type, an organization may not use sales channels that allow unambiguous identification of its type, and/or the rule-based determination of the type of a business (e.g., based on MCC codes) may break down, for example, in case of a sale of food items which could be associated with a service-oriented business (a restaurant) or a product-oriented business (a store).

In one or more embodiments of the disclosure, unknown organizations, i.e., organizations for which it is not known of what type they are, are categorized. The categorization of an unknown organization is performed based on a prediction of the type of the unknown organization. The prediction, in one or more embodiments, is performed based on transactional data associated with the unknown organization. Consider, for example, an unknown organization that uses a software services to generate invoices. Each invoice may include a descriptive text for what is being invoiced. For example, an invoice may include line items, with each line item including a descriptive text. The descriptive text may be indicative of the type of organization, and may thus be used to distinguish one type of organization from another type of organization. When comparing, for example, descriptive text associated with a product-oriented organization and descriptive text associated with a service-oriented organization, the text associated with the service-oriented organization may include more verbs or, more generally, terms describing activities, in comparison to the text associated with the product-oriented organization. Other elements of the transactional data may further support the distinction of types of organizations, as discussed in detail below.

In one or more embodiments, a supervised learning is used to categorize unknown organizations based on descriptive texts and potentially other transactional data associated with the unknown organizations. In one or more embodiments, a classifier is trained using data available for known organizations. For these known organizations, the type of organization has been determined, and sufficient transactional data, including descriptive texts, are available for the training of the classifier. The trained classifier may subsequently be applied to transactional data of unknown organizations to predict the type of these unknown organizations.

In the following description, a system for classifying organizations based on transactional data associated with the organizations. A description of the methods performed by the system follows.

Turning to FIG. 1, a system (100) in accordance with one or more embodiments is shown. The system includes a software service (110) and a system for classifying organizations based on transactional data (120). Each of these components is subsequently described. The software service (110) may be accessed by unknown organizations (190). Unknown organizations may be organizations that have not yet been classified by the system for classifying organizations based on transactional data (120). Unknown organizations do, however, have or have had interactions with the software service (120), that result or resulted in the exchange of transactional data (192), discussed in detail below. For example, the unknown organization (190) may process purchase orders through the software service (110), may generate invoices through the software service (110), etc.

In one or more embodiments, the system for classifying organizations based on transactional data (120) is configured to classify the unknown organization (190) based on the transactional data (192). In one or more embodiments, the transactional data (192) includes descriptive texts associated with transactions (194). A transaction may be between the unknown organization (190) and a third party (not shown) and may relate to an exchange of goods, delivery of a service or project, etc. The execution or preparation of transactions may result in the transactional data (192) which may be available in various forms. For example, the transactional data may be in the form of a purchase order, a quote, a proposal, an invoice, or any other transactional document. The transactional document may have in common that they include line items, e.g., one line item for each element of a transaction. For example, an online hardware store may issue an invoice for 5,000 wood screws, 600 nails, and 10 sheets of plywood. Accordingly, in the example, there are three line items, with each of these line items including a descriptive text. Additional examples of line items are discussed below, with reference to FIG. 2. The descriptive texts associated with the transactions (194) may be processed by the methods shown in FIGS. 3, 4, 5A, 5B, and 6.

The transactional data (192) may further include quantifications of transactions (196). The quantifications may be specific to the line items. For example, a quantification may be a quantity, a cost, and/or a price.

A quantification may consider a larger volume of transactions, for example, when determining a total or average number of line items, refunds, transactions, number of items sold, price, etc. Each of these may be considered over different time intervals (e.g., per day, week, month, . . . ).

A quantification may further be specific to an entire transactional document. For example, a quantification may be a total or average cost or price, a total number of line items, etc.

Further, a quantification may also quantify a timing, e.g., a time between a creation of a transaction, and a payment for the transaction.

The quantifications of the transactions (196) may provide additional cues regarding the type of the organization. For example, it may be common that products are sold at a higher volume than services. Accordingly, consistently high sales quantities may indicate that an organization is a business that is product-oriented. Also, when items are not only sold but also bought (same item with both positive and negative quantities of price/cost, or presented in the cost-of-goods data as an item that was bought), this may serve as an indication that a merchant is a reseller. In a similar manner, manufacturers may be identified based on buying items and selling other items (e.g., wax may be purchased to manufacture candles). Similarly, the time between creation of a transaction and payment may also provide insight into the type of a business, because services are frequently paid for at a later time, e.g., after 30, 60, or 90 days, whereas products tend to require immediate payment.

To make such determinations, the quantifications of the transactions (196) may be processed by the methods shown in FIGS. 3, 4, 5A, 5B, and 6.

Figure 8A:
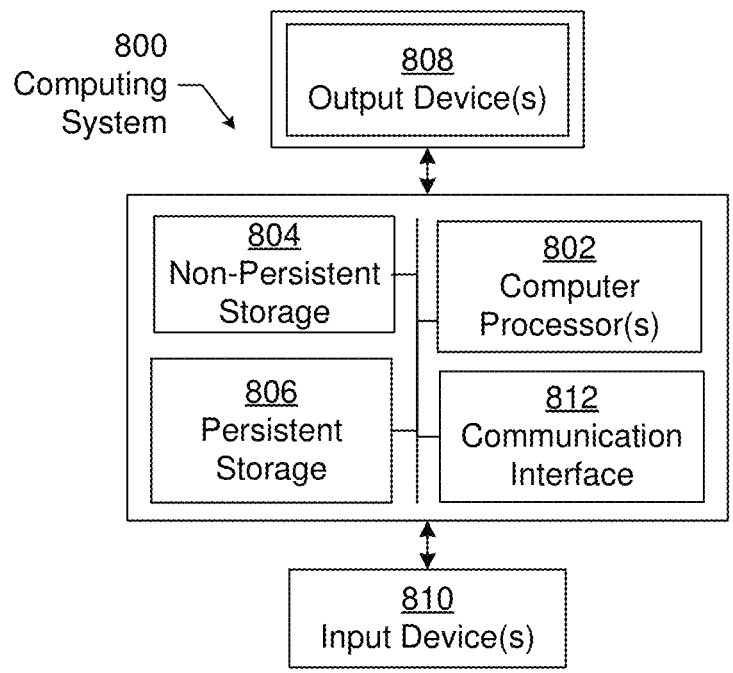
FIG. 8A and FIG. 8B show computing systems, in accordance with one or more embodiments of the disclosure.
Figure 8B:
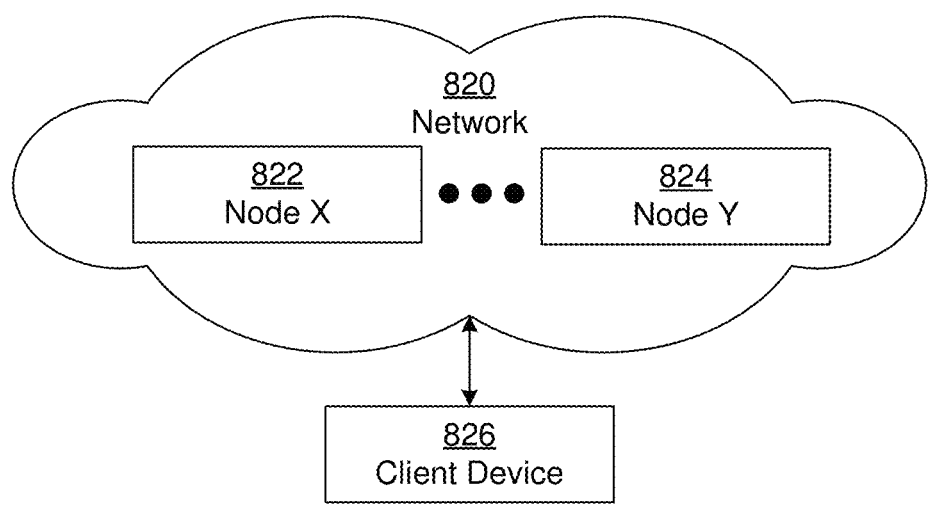

The software service (110) may provide one or more functionalities to support, for example, accounting tasks, tax calculation tasks, record keeping and/or other administrative tasks. The software service may further interface with an online presence of the unknown organization, for example, a sales platform. The software service (110) may be hosted on a computing system. An example computing system is shown in FIGS. 8A and 8B. In one or more embodiments, at least parts of the software service (110) are cloud-hosted.

The system for classifying organizations based on transactional data (120) includes a known organization database (130), a supervised classifier training engine (160), and a classification engine (170). The system for classifying organizations based on transactional data (120) may be connected to the software service (110) via a network (not shown). The network may include wide area network segments (such as the Internet) and/or local area network segments and may allow secured and/or non-secured communications.

The known organization database (130), in accordance with one or more embodiments, includes ground truth data of known organizations, i.e., trusted data that may be used by the supervised classifier training engine (160) to train a classifier (164) as described in detail with reference to the flowcharts of FIG. 3, FIG. 4, FIG. 5A, and FIG. 5B. Known organizations, in one or more embodiments, are distinguished from the previously discussed unknown organizations in that for known organizations the type of the organizations is known.

For each known organization, the known organization database may include an organization ID (132), a label (134), and descriptive texts associated with transactions (136), described below. The format and structure of the known organization database (130) may vary without departing from the disclosure. The known organization database (130) may be stored in non-volatile or volatile memory, e.g. on a hard disk drive or in RAM. The known organization database (130) may be central or distributed.

The organization IDs (132) may be used to uniquely identify known organizations. An organization ID may be of any format and may include numbers and/or characters.

In one or more embodiments, the labels (134) indicate the types of the organizations in the known organization database (130). For example, a label may indicate that a known organization is product-oriented, service-oriented, or project-oriented. The existence of a label for an organization is what distinguishes a known organization from an unknown organization. In other words, a label is associated with a known organization whereas no label is available for an unknown organization, because the type of the unknown organization is not known. By performing the methods described below with reference to FIG. 6, an unknown organization may be classified, thus making it a known organization. Further, the obtaining of labels (134) for known organizations is described below with reference to FIG. 4.

In one or more embodiments, transactions are associated with known organizations, similar to the transactions associated with the unknown organizations, as previously discussed. Accordingly, the known organization database (130) includes descriptive texts associated with the transactions of the known organizations (136) analogous to the descriptive texts associated with the transactions of the unknown organization (194). Similarly, quantifications of transactions of the known organizations (138) may exist in the known organization database (130), analogous to the quantifications of transactions of the unknown organization (196).

The supervised classifier training engine (160), in accordance with one or more embodiments, includes a set of machine-readable instructions (stored on a computer-readable medium) which, when executed, perform one or more of the operations described in the flowcharts of FIG. 3, FIG. 4, FIG. 5A, and FIG. 5B. Execution of the one or more operations may result in the training of the classifier (164). In one embodiment, the classifier (164) is a support vector machine. Alternatively, the classifier (164) may be of any other type that may be trained using methods of supervised machine learning. For example, neural network classifiers, naïve Bayes classifiers, etc., may be used.

To train the classifier (164), the descriptive texts associated with a known organization (136) are processed to obtain a vector representing the known organization (162). One vector may be generated for each known organization. The vector may represent information in the descriptive texts in the condensed format of a single vector. The vector may further include information obtained from the quantifications of the transactions of the known organization (138). The obtaining of the vector is described below with reference to FIGS. 3, 5A, and 5B. The vectors representing the known organizations (162) and the labels (134), in combination, may serve as the training data for training the classifier (164). Once trained, the classifier may operate as a classifier of unknown organizations, based on the descriptive texts associated with the unknown organizations, and optionally based on the quantifications of transactions associated with the unknown organizations.

Figure 5A:
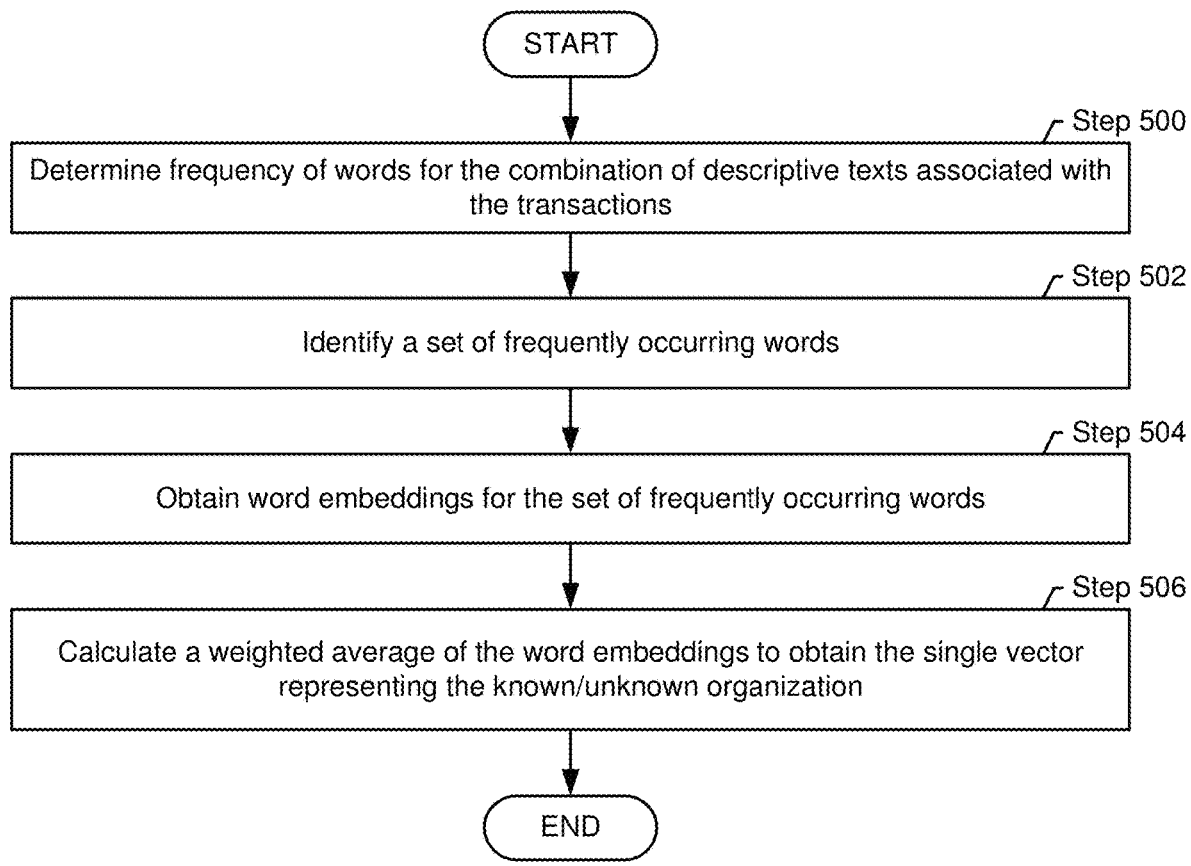
Figure 5B:
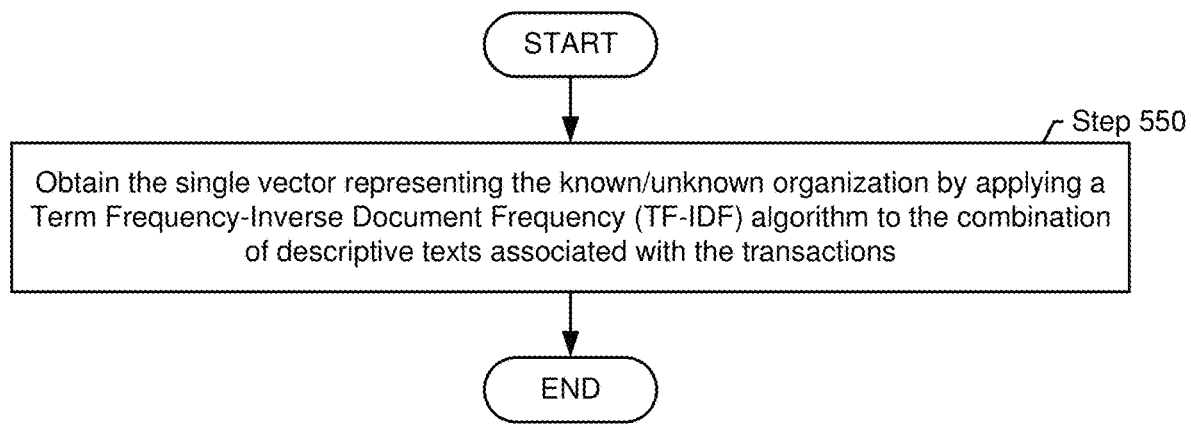
Figure 6:
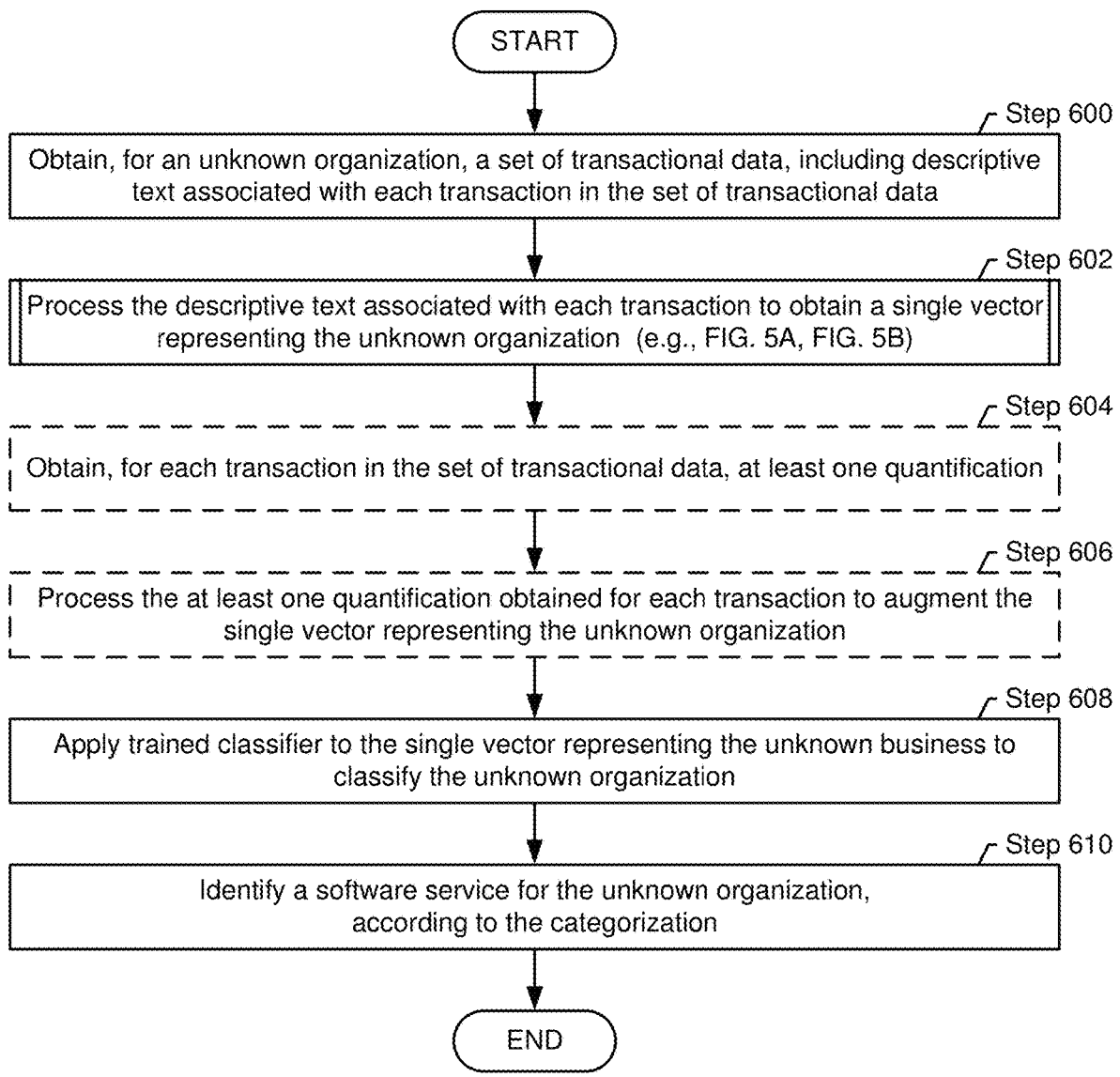

The classification engine (170), in accordance with one or more embodiments, includes a set of machine-readable instructions (stored on a computer-readable medium) which, when executed, perform one or more of the operations described in the flowcharts of FIG. 6, FIG. 5A, and FIG. 5B. When executing one or more of these operations, the classification engine (170) may use the classifier (174) to predict the type of an unknown organization. The classifier (174) may be the classifier (164), previously generated by the supervised classifier training engine (160). The classifier (174), in one embodiment, operates on the vector representing the unknown organization (172). The vector representing the unknown organization (172) may be analogous to the vectors representing known organizations (162), as previously described.

While FIG. 1 shows a configuration of components, other configurations may be used without departing from the scope of the disclosure. For example, various components may be combined to create a single component. As another example, the functionality performed by a single component may be performed by two or more components that may be communicatively connected using a network connection.

Turning to FIG. 2, examples of line items, in accordance with one or more embodiments, are shown. The line items (200) may be associated with one organization. Referring to FIG. 1, assume that the line items are associated with one of the known organizations in the known organization database (130). The line items (200) may be a compilation of line items gathered from multiple transactions. While not all line items are readily interpretable by a naïve reader, many of the line items (200) include text suggesting that the organization associated with the line items is involved in selling various types of food and drinks. While FIG. 2 provides an example of line items illustrating how line items may provide indications for the type of the associated organization, FIG. 2 is merely one example for descriptive texts. Other descriptive texts may be provided in different formats. For example, descriptive texts may be provided in complete sentences or paragraphs (e.g., when the scope of a project is described). Descriptive texts may also include quantities, pricing, etc. Further, fewer or more line items may be available for an organization. For example, for a larger organization, a descriptive text may include thousands or more line items.

FIG. 3, FIG. 4, FIG. 5A, FIG. 5B, and FIG. 6 show flowcharts in accordance with one or more embodiments. The flowcharts of FIG. 3, FIG. 4, FIG. 5A, and FIG. 5B depict methods for training a classifier to classify unknown organizations. The flowcharts of FIG. 6, FIG. 5A, and FIG. 5B depict methods for classifying unknown organizations, using the previously trained classifier. One or more of the steps in FIG. 3, FIG. 4, FIG. 5A, FIG. 5B, and FIG. 6 may be performed by various components of the systems, previously described with reference to FIG. 1.

While the various steps in these flowcharts are presented and described sequentially, one of ordinary skill will appreciate that some or all of the steps may be executed in different orders, may be combined or omitted, and some or all of the steps may be executed in parallel. Additional steps may further be performed. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention. Accordingly, the scope of the disclosure should not be considered limited to the specific arrangement of steps shown in FIG. 3, FIG. 4, FIG. 5A, FIG. 5B, and FIG. 6.

Figure 3:
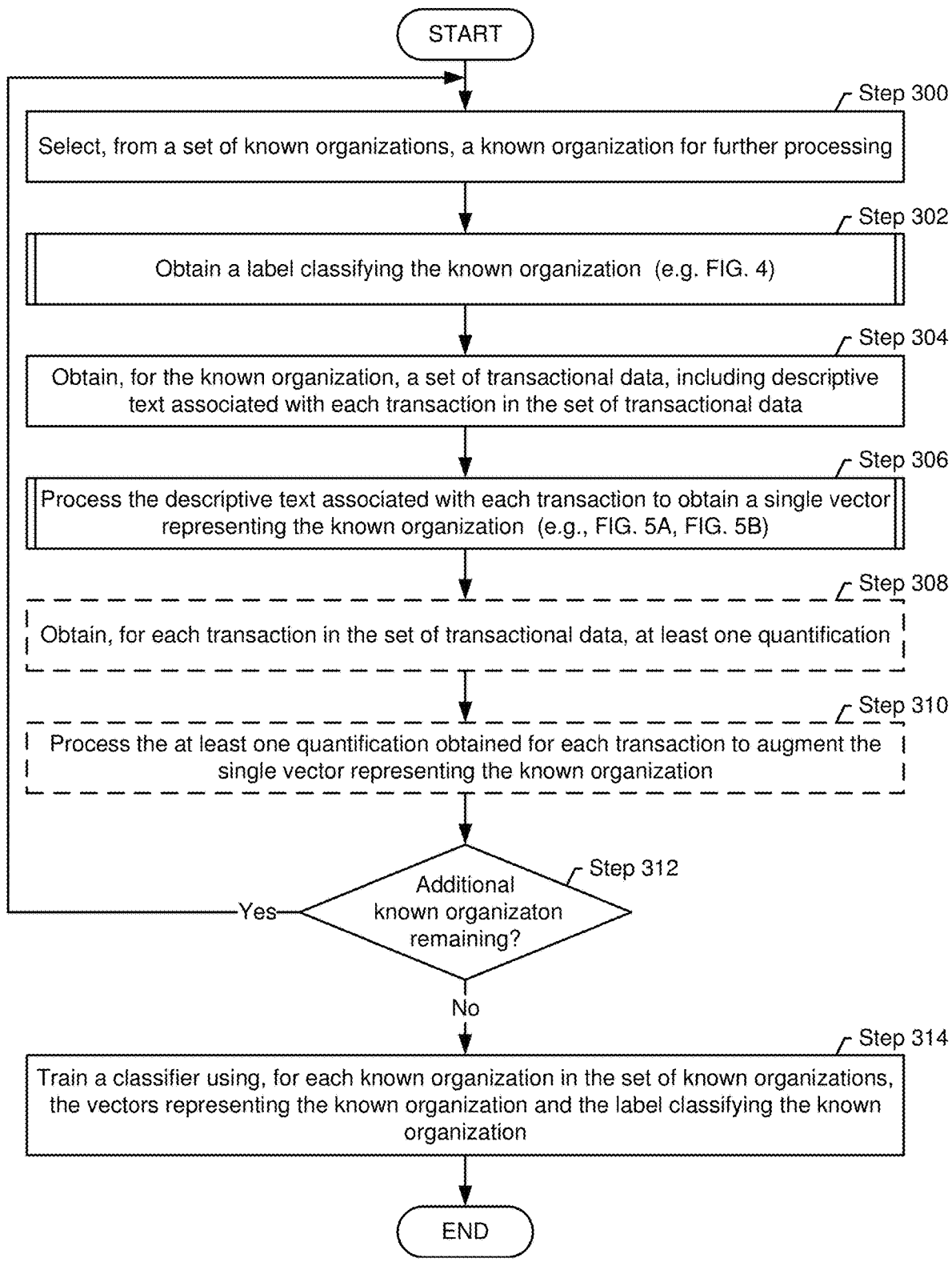
FIG. 3, FIG. 4, FIG. 5A, FIG. 5B, and FIG. 6 show flowcharts describing methods for the classification of an unknown organization based on transactional data, in accordance with one or more embodiments of the disclosure.

Turning to the flowchart of FIG. 3, a method for training a classifier, in accordance with one or more embodiments, is shown. Broadly speaking, the method may be executed to subsequently allow classification of organizations based on transactional data associated with the organizations, using the trained classifier. The training involves methods of supervised machine learning as described below. The data used for training is performed using training data that is based on known organizations, i.e., organizations for which the type has been determined.

In Step 300, a known organization is selected for further processing. The known organization may be selected from a set of known organizations in a database. The following Steps 302-310 may be performed for the selected known organization. Later, another known organization may be selected for further processing. By repeating the selections of a known organization and a processing, eventually, a number of known organizations (e.g. a subset of the known organizations in the database, or all known organizations) are processed as described subsequently described.

In Step 302, a label is obtained for the known organization. The label may specify the type of the organization. In one embodiment, the label identifies one of a product-oriented organization, a service-oriented organization, and a project-oriented organization. A label may further identify subcategories. For example, a product-oriented organization may be labeled as a reseller. A detailed description of the obtaining of labels is provided with reference to FIG. 4.

In Step 304, a set of transactional data is obtained for the known organization. The set of transactional data may be for transactions, and the set of transactional data may include a descriptive text for each transaction. The set of transactional data may be obtained in the form of line items of transactional documents such as purchase orders, order confirmations, quotes, proposals, invoices, etc. Examples of line items as obtained in Step 304 are provided in FIG. 2. Any number of line items may be obtained for the known organization.

In Step 306, the descriptive texts, obtained in Step 304 are processed to obtain a single vector representing the known organization. Broadly speaking, methods of natural language processing are applied to generate the single vector from the combination of the descriptive texts. Accordingly, the single vector representing the known organization may be understood as summarizing the combination of descriptive texts. Different methods, described in FIGS. 5A and 5B, may be used to obtain the vector. Depending on chosen method, different vectors may result, and the size (number of elements) of the vector may differ.

In Step 308, a quantification is obtained for the transactions represented by the set of transactional data. A quantification may be obtained for all transactional documents associated with the known organization, a single transactional document, individual line item, etc. Any kind of quantification, as previously described, may be obtained. Examples for quantifications include a number (i.e., a cardinality) of (daily, weekly, monthly, etc.) line-items, a number of (daily, weekly, monthly, etc.) refunds, a number of items per invoice, a price of a product, a number of (daily, weekly, monthly, etc.) transactions, an average price of transactions, a number of transactions, a number of items sold, a fraction of transactions that were not paid at the time of transaction creation, a fraction of sold items that are also being bought by the merchant (same item with both positive and negative amount, or presented in the cost-of-goods data as an item that was bought), etc.

The execution of Step 308 is optional. Step 308 may be skipped if no quantifications exist in the transactional data, or if existing quantifications are not to be considered for the processing described below.

In Step 310, the quantifications, obtained in Step 308, are processed to augment the vector representing the organization. The processing may involve normalizing the obtained quantifications, and performing a concatenation operation to augment the vector. If no quantification is obtained in Step 308, Step 310 may be skipped.

In Step 312, if an additional known organization remains for processing as described, the method may return to Step 300 to repeat the described steps for the additional known organization. If no additional known organization remains, the method may proceed with the execution of Step 314.

In Step 314, the classifier is trained using training data obtained by executing Steps 300-312. The training data consists, for each of the known organizations, of a pair including the vector representing the known organization, and the label classifying the known organization.

Depending on the type of classifier being used, the training may differ. For example, if a support vector machine (SVM) or multi-class SVM is used as a classifier, the training may involve maximizing margins around separating hyperplanes. The maximizing the margins may be expressed as a quadratic programming problem. Further, a transformation may be introduced to allow for a linear separation. An SVM may be particularly effective when dealing with high-dimensional data such as vectors representing known organizations. However, other classification algorithms may alternatively be used, without departing from the disclosure.

Training the classifier may further involve additional steps. Prior to the training of the classifier, the available data (including the vectors representing the known organizations and the labels classifying the known organizations) may be sampled to obtain training data and validation data. Training data and validation data may be obtained based on a ratio. For example, 80% of the available data may be used as training data and 20% of the available data may be used as validation data. The selection of training data and validation data may be performed pseudo-randomly. Further, the available data may be sampled to obtain a balanced ratio between the different types of known organizations. For example, if the known organizations in the training data are labeled as either "product-oriented", "service-oriented", or "project-oriented", then the training data may be sampled such that one third of the known organizations are of each of these types.

The training of the classifier may be performed iteratively. After training the classifier based on training data, the trained classifier may be assessed using the validation data to determine the accuracy of the classifier. The training of the classifier may also involve the tuning of hyperparameters. After adjusting one or more hyperparameters of the classifier, the iterative training may be repeated. Cycles of adjusting hyperparameters and training the classifier may be repeated until satisfactory predictive performance is achieved.

Figure 4:
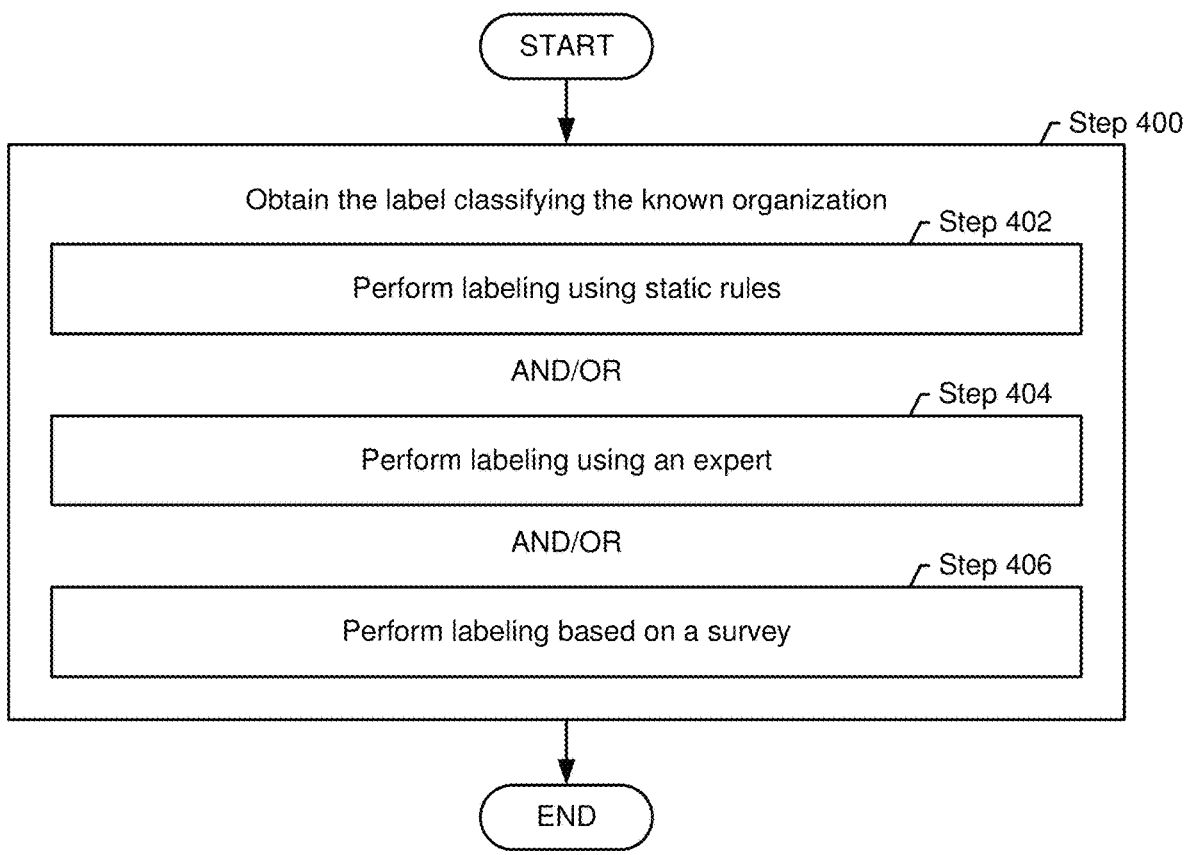

Turning to FIG. 4, a method for obtaining labels classifying the known organizations is described. Three approaches are described. The labels for the known businesses may be obtained using one of the three described approaches. Alternatively, a mix of the three approaches may be used, i.e., some labels may be obtained using one of the three approaches, and other labels may be obtained using other approaches. Further, the approaches may be used in combination to vote on labels, i.e., two or three of the approaches may be applied to the same known business, and the label is then assigned based on a majority vote.

In Step 402, the labeling is performed using static rules. The use of static rules may enable an automated labeling. Static rules may be applied to various information that is accessible through, for example, the software service shown in FIG. 1. For example, the software service may determine a sales channel used by an organization. A rule may then be used to determine the type of organization, based on the sales channel. For example, a rule may generate the label "product-oriented", when an organization relies on eBay or other marketplaces as a sales channel. Further, the software service may report an identifier associated with the organization, such as a merchant category code (MCC). A rule may then be used to determine the type of organization based on the identifier. For example, a rule may generate the label "service-oriented", when an MCC code identifying a landscaping service is evaluated. Similarly, a North American Industry Classification System (NAICS) code may be evaluated. Other information that may be evaluated using static rules may be obtained from the transactional data. Specifically, for example, a payment term of 30 days is typical for transactions associated with services, whereas immediate payment is more typical for transactions associated with products. Accordingly, a rule may generate the label "service-oriented" when a payment term of 30 days is detected, whereas a rule may generate the label "product-oriented" when a payment is immediately due.

In Step 404, the labeling is performed by an expert. The expert may be a human who manually reviews the organization, and then labels the organization. The expert may rely on various resources. For example, the expert may review the transactional data, and other available information about the organization, such as a web-presence of the organization, review portals covering the organization, and any other source of information such as published documents. The expert may also contact the organization to obtain information about the organization. Upon review of this information, the expert may assign a label.

In Step 406, the labeling is performed based on feedback obtained in response to a survey. The survey may be distributed to numerous unknown organizations. The survey may include one or more questions phrased such that, based on answers to the questions, an unknown organization can be clearly labeled, thus becoming a known organization, for the purpose of executing the described methods.

FIGS. 5A and 5B show methods for obtaining a vector, representing a known or an unknown organization. Either the method of FIG. 5A or the method of FIG. 5B may be used to perform Step 306 of FIG. 3 and Step 602 of FIG. 6.

Turning to FIG. 5A, in Step 500, the frequency of words for the combination of descriptive texts associated with the transactions of an organization is determined. Consider, the collection of line items shown in FIG. 2. These line items form the descriptive texts associated with a known or unknown organization. Assume that the line items shown in FIG. 2 represent all the descriptive texts that are available for the organization. For all the line items in combination, the frequency of words is determined. As a result, counts of the words found in the line items become available. For example, there will be a count for the words "shipping", "square, "transaction, "sandwich", etc. While determining a frequency of words is described, alternatively other semantic units may be considered. For example, terms such as "square transaction", "sandwich bag", etc. may be considered. Further, for the purpose of the frequency determination, the similarity of terms may be considered. For example, the terms "Sandwich-Bag" and "Sandwich Bag" may be considered equivalent.

In Step 502, a set of frequently occurring words (or other semantic units) is identified. The set of frequently occurring words may be obtained by first sorting the words by their frequency, and by subsequently selecting a subset of the words, e.g., the first ten, hundred, thousand, 10%, 15%, etc., of the words. Any number or percentage of words may be selected.

In Step 504, word embeddings are obtained for the set of frequently occurring words. The word embeddings may be obtained using various methods for generating word embeddings, including, but not limited to, word2vec, GloVe, and fast-Text. word2vec is a model that produces word embeddings using a shallow, two-layer neural network that has been trained to reconstruct linguistic contexts of words. Fast-Text is an extension of word2vec which processes words based on n-grams of characters instead of processing the words directly. GloVe, unlike word2vec is not based on neural networks and instead uses a log-bilinear model with a weighted least-squares objective to produce the word embeddings. These algorithms may have been pre-trained using either a generic corpus or a corpus that is specific to the vocabulary that is likely to be relevant in view of the known and unknown organizations.

In Step 506, a weighted average of the vectors is calculated. The weighting, in one embodiment, is based on the frequency of the words that are considered. For example, a vector representing a word that appears 50 times would have twice the weight of a vector representing a word that appears 25 times. The resulting vector represents the organization, based on the processing of the descriptive texts In Steps 500-506.

Turning to FIG. 5B, in Step 550, a vector representing the known or unknown organization is obtained using a Term Frequency-Inverse Document Frequency (TF-IDF) algorithm. The TF-IDF algorithm may be applied to all words (or other semantic units) of the combination of all descriptive texts available for the organization. The output of the TF-IDF of a word is a value that characterizes the importance of the word in the combination of all descriptive texts, while discounting words that appear more frequently in general. After execution of the TF-IDF algorithm for the words, the vector may be established by combining the TF-IDF values. Because the vector may have been established to include elements for certain words, not all elements of the vector may be populated after an execution of the TF-IDF algorithm for the organization. For example, if one element of the vector represents the word "strawberry", but the word strawberry does not appear in the descriptive texts, no value, or the value "0" may be entered for that element of the vector. Also, if the descriptive texts include a word that is not represented by the vector, no value is entered.

Turning to FIG. 6, a flowchart describing a method for classifying an unknown organization, in accordance with one or more embodiments, is shown. The method may use the classifier previously trained as described with reference to FIG. 3, FIG. 4, FIG. 5A, and FIG. 5B.

In Step 600, a set of transactional data is obtained for the unknown organization. The set of transactional data may be for transactions, and the set of transactional data may include a descriptive text for each transaction. The set of transactional data may be obtained in the form of line items of transactional documents such as purchase orders, order confirmations, quotes, proposals, invoices, etc. Examples of line items as obtained in Step 600 are provided in FIG. 2. Any number of line items may be obtained for the unknown organization. Step 600 may be similar to Step 304, which may have been performed as part of the training of the classifier to be used for the classification.

In Step 602, the descriptive texts, obtained in Step 600 are processed to obtain a single vector representing the unknown organization. Broadly speaking, methods of natural language processing are applied to generate the single vector from the combination of the descriptive texts. Accordingly, the single vector representing the unknown organization may be understood as summarizing the combination of descriptive texts. Different methods, described in FIG. 5A and FIG. 5B, may be used to obtain the vector. Depending on chosen method, different vectors may result, and the size (number of elements) of the vector may differ. Step 602 may be similar to Step 306, which may have been performed as part of the training of the classifier to be used for the classification.

In Step 604, a quantification is obtained for the transactions represented by the set of transactional data.

A quantification may be obtained for all transactional documents associated with the unknown organization, a single transactional document, individual line item, etc. Any kind of quantification, as previously described, may be obtained. The execution of Step 604 is optional. Step 604 may be skipped if no quantifications exist in the transactional data, or if existing quantifications are not to be considered for the processing described below. Step 604 may be similar to Step 308, which may have been performed as part of the training of the classifier to be used for the classification.

In Step 606, the quantifications, obtained in Step 604, are processed to augment the vector representing the unknown organization. The processing may involve normalizing the obtained quantifications, and performing a concatenation operation to augment the vector. If no quantification is obtained in Step 604, Step 310 may be skipped. Step 606 may be similar to Step 310, which may have been performed as part of the training of the classifier to be used for the classification.

In Step 608, the trained classifier, is applied to the vector representing the unknown organization. For example, an SVM algorithm may be applied to the vector representing the unknown organization. The result may be a classification of the unknown organization. The classifier user in Step 608 may have been trained using the method described in the flowchart of FIG. 3. Accordingly, a prerequisite for the execution of the method of FIG. 6 for an unknown organization may be the training described in FIG. 3, using known organizations.

In Step 610, a software service is identified for the unknown organization, according to the categorization performed in Step 608. As initially described based on the examples of organizations that are "product-oriented", "service-oriented", and/or "project-oriented", these organizations may have different requirements regarding the software service. Accordingly, depending on the classification, different software services or different customizations of a software service may be identified. The identified software service may subsequently be delivered or marketed to the unknown organization. Alternatively the categorization may trigger other actions such as a more targeted software development, support, marketing, etc.

While the methods have been described within the framework of classifying businesses as "product-oriented", "service-oriented", and/or "project-oriented", those skilled in the art will appreciate that the methods are applicable to any type of classification. For example, a product-oriented organization may be further classified as a wholesaler, a manufacturer, a reseller, etc.

Figure 7:
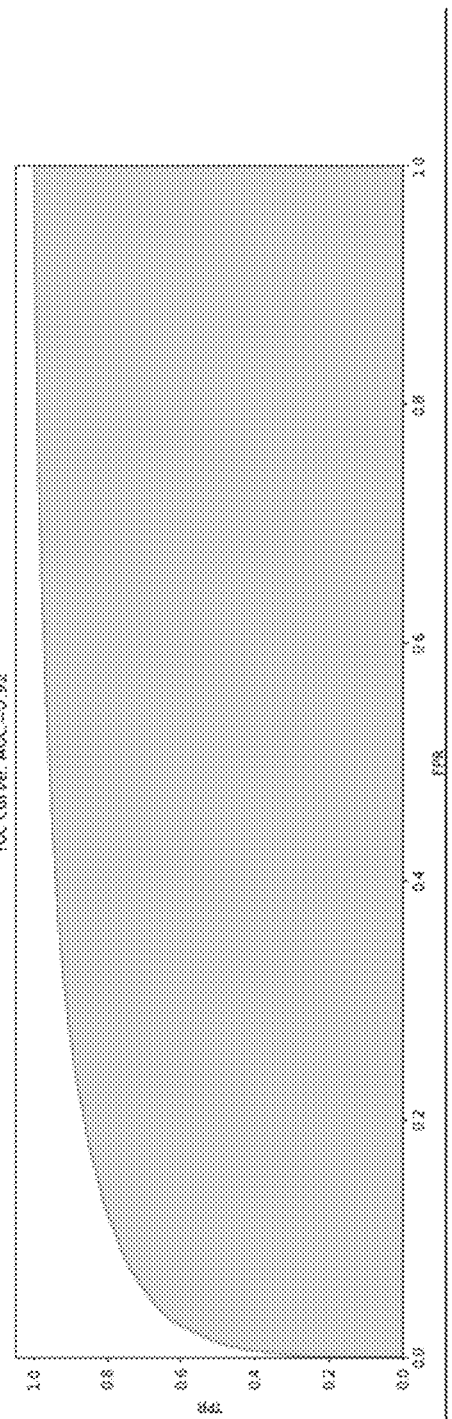
FIG. 7 shows an example of performance data obtained when executing one or more of the methods for classifying an unknown organization based on transactional data, in accordance with one or more embodiments.

FIG. 7 shows an example of performance data (700) obtained when executing methods for classifying an organization based on transactional data, in accordance with one or more embodiments. The results were obtained for a binary classification task in which businesses were to be classified as either a service-based business (SBB) or a product-base business (PBB). A support vector machine (SVM) was trained as described in FIGS. 3, 4, and 5A using transactional training data (line items) associated with known businesses (i.e., businesses labeled as either SBB or PBB). Subsequently, the trained support vector machine was applied to transactional test data associated with known businesses to test the predictive performance of the support vector machine. The predictions using the trained support vector machine were performed as described in FIG. 6, FIG. 4, and FIG. 5A. The example performance data (700) suggests accurate predictions by the support vector machine, as evaluated based on precision, recall, and f1-score. The receiver operating characteristic (ROC) curve indicates a high true positive rate and a low false positive rate.

Various embodiments of the disclosure have one or more of the following advantages. Embodiments of the disclosure enable the prediction of the type of an organization, based on transactional data available for the organization. The prediction, in one or more embodiments, is made by a classifier that was trained using supervised machine learning. The classifier may operate without requiring human supervision and the classification performance. The classifier performance was found to be better than similar classifications performed using static rules, in particular for organizations that do not use typical sales or marketing channels. For example, while conventional sales channels such as eBay, Amazon, etc., may allow an organization to be classified as product-oriented, this may not be the case for organizations that use personal web pages, physical stores, etc. For these types of organizations, the classification according to embodiments of the disclosure proved to be far superior. Organizations may thus be reliably classified based on their type (e.g., as product-oriented, service-oriented, and/or project oriented).

Embodiments of the disclosure therefore enable the delivery and/or marketing of services or functionalities, e.g., of a software product, in a targeted manner that would otherwise not be feasible. A user of the software product benefits by receiving useful products and/or services rather than generic tools, which is likely to result in higher user productivity and satisfaction. These factors are likely to result in higher sales for the software provider, over time. Also, better knowledge of the user base enables the software provider to support a more targeted software development, support, marketing, etc., which are factors that may increase revenue and/or reduce cost.

Embodiments of the invention may be implemented on a computing system. Any combination of mobile, desktop, server, router, switch, embedded device, or other types of hardware may be used. For example, as shown in FIG. 8A, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (800) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8A. Further, the client device (826) may include and/or perform all or a portion of one or more embodiments of the invention.

The computing system or group of computing systems described in FIG. 8A and FIG. 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 8A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 8A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 8A and the nodes and/or client device in FIG. 8B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for classifying organizations, comprising:
    obtaining, for an unknown organization, transactional data representing a plurality of transactions, wherein the transactional data comprises a descriptive text for each of the plurality of transactions;
    obtaining, for each of the plurality of transactions, at least one quantification of the transaction;
    processing the descriptive text for each of the plurality of transactions to obtain one vector representing the unknown organization;
    augmenting the vector using the at least one quantification obtained for each of the plurality of transactions;
    categorizing the unknown organization using a classifier applied to the vector; and
    identifying a software service for the unknown organization, according to the categorization.

2. The method of claim 1, wherein the at least one quantification comprises at least one selected from a group consisting of:
    a cardinality of line items in the transactional data,
    a cardinality of the plurality of transactions,
    prices associated with the line items,
    an average price for the plurality of transactions, and
    a fraction of the plurality of transactions not immediately paid.

3. The method of claim 1, wherein the classifier is a support vector machine (SVM).

4. The method of claim 1, wherein the descriptive text associated with one of the plurality of transactions comprises at least one line item in a transactional document associated with the transaction.

5. The method of claim 4, wherein the transactional document is one selected from a group consisting of an:
   a purchase order,
   an order confirmation,
   a quote, and
   an invoice.

6. The method of claim 1, wherein categorizing the unknown organization comprises identifying the unknown organization as one selected from a group consisting of a product-oriented organization, a service-oriented organization, and a project-oriented organization.

7. The method of claim 1, wherein processing the descriptive text for each of the plurality of transactions to obtain the vector comprises performing a Term Frequency-Inverse Document Frequency (TF-IDF) operation on the plurality of descriptive texts.

8. The method of claim 1, wherein processing the descriptive text for each of the plurality of transactions to obtain the vector comprises:
   identifying frequently occurring words in the plurality of descriptive texts;
   obtaining word embeddings for the frequently occurring words; and
   calculating a weighted average of the word embeddings to obtain the vector representing the unknown organization.

9. A system for classifying organizations, the system comprising:
   a computer processor; and
   a classification engine executing on the computer processor configured to:
      obtain, for an unknown organization, transactional data representing a plurality of transactions, wherein the transactional data comprises a descriptive text for each of the plurality of transactions;
      obtain, for each of the plurality of transactions, at least one quantification of the transaction;
      process the descriptive text for each of the plurality of transactions to obtain one vector representing the unknown organization;
      augment the vector using the at least one quantification obtained for each of the plurality of transactions;
      categorize the unknown organization using a classifier applied to the vector; and
      identify a software service for the unknown organization, according to the categorization.

10. The system of claim 9, the system further comprising:
   a known organization database comprising, for each of a plurality of known organizations:
      a label identifying a category to which the known organization associated with the label belongs;
      a plurality of known organization transactional data associated with a plurality of known organization transactions, wherein the known organization transactional data comprises a known organization descriptive text for each of the plurality of known organization transactions; and
   a supervised classifier training engine configured to:
      obtain, for each of the plurality of known organizations, the label;
      obtain, for each of the plurality of known organizations, the known organization descriptive text for each of the plurality of known organization transactions;
      process the plurality of known organization descriptive texts to obtain a plurality of known organization vectors for the plurality of known organizations, wherein each of the plurality of known organization vectors represents one of the plurality of known organizations; and
      train the classifier, using, for each of the plurality of known organizations, the known organization vector representing the known organization and the label associated with the known organization.

11. The system of claim 10, wherein obtaining the plurality of labels associated with the plurality of known organizations comprises at least one selected from a group consisting of:
   assigning at least one of the plurality of labels using static rules,
   receiving at least one of the plurality of labels from a human, and
   evaluating a survey.

12. The system of claim 9, wherein the classifier is a support vector machine (SVM).

13. The system of claim 9, wherein processing the descriptive text for each of the plurality of transactions to obtain the vector comprises:
   identifying frequently occurring words in the plurality of descriptive texts;
   obtaining word embeddings for the frequently occurring words; and
   calculating a weighted average of the word embeddings to obtain the vector representing the unknown organization.

14. The system of claim 9, wherein processing the descriptive text for each of the plurality of transactions to obtain the vector comprises performing a Term Frequency-Inverse Document Frequency (TF-IDF) operation on the plurality of descriptive texts.

15. A method for classifying organizations, comprising:
   obtaining, for an unknown organization, transactional data representing a plurality of transactions, wherein the transactional data comprises a descriptive text for each of the plurality of transactions;
   processing the descriptive text for each of the plurality of transactions to obtain one vector representing the unknown organization, wherein the processing comprises:
      identifying frequently occurring words in the plurality of descriptive texts;
      obtaining word embeddings for the frequently occurring words; and
      calculating a weighted average of the word embeddings to obtain the vector representing the unknown organization;
   categorizing the unknown organization using a classifier applied to the vector; and
   identifying a software service for the unknown organization, according to the categorization.

16. The method of claim 15, wherein the classifier is a support vector machine (SVM).

17. The method of claim 15, wherein the descriptive text associated with one of the plurality of transactions comprises at least one line item in a transactional document associated with the transaction.

18. The method of claim 17, wherein the transactional document is one selected from a group consisting of an:

a purchase order,
an order confirmation,
a quote, and
an invoice.

19. The method of claim 15, wherein categorizing the unknown organization comprises identifying the unknown organization as one selected from a group consisting of a product-oriented organization, a service-oriented organization, and a project-oriented organization.

20. The method of claim 15, wherein processing the descriptive text for each of the plurality of transactions to obtain the vector comprises performing a Term Frequency-Inverse Document Frequency (TF-IDF) operation on the plurality of descriptive texts.

* * * * *